United States Patent
Cherepanov et al.

(10) Patent No.: US 10,579,730 B1
(45) Date of Patent: *Mar. 3, 2020

(54) ALLOWING SPELLING OF ARBITRARY WORDS

(71) Applicant: Google LLC, Mountain View, CA (US)

(72) Inventors: Evgeny A. Cherepanov, Adliswil (CH); Gleb Skobeltsyn, Kilchberg (CH); Jakob Foerster, San Francisco, CA (US); Petar Aleksic, Jersey City, NJ (US); Assaf Hurwitz Michaely, Long Island City, NY (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/258,230

(22) Filed: Jan. 25, 2019

Related U.S. Application Data

(63) Continuation of application No. 15/700,614, filed on Sep. 11, 2017, now Pat. No. 10,229,109, which is a continuation of application No. 14/989,621, filed on Jan. 6, 2016, now Pat. No. 9,971,758.

(51) Int. Cl.
| | |
|---|---|
| G10L 15/22 | (2006.01) |
| G10L 15/30 | (2013.01) |
| G10L 15/26 | (2006.01) |
| G06F 17/27 | (2006.01) |
| G10L 15/197 | (2013.01) |
| G10L 15/187 | (2013.01) |
| G10L 15/32 | (2013.01) |
| G10L 15/08 | (2006.01) |

(52) U.S. Cl.
CPC .......... *G06F 17/273* (2013.01); *G10L 15/187* (2013.01); *G10L 15/197* (2013.01); *G10L 15/26* (2013.01); *G10L 15/32* (2013.01); *G10L 2015/086* (2013.01)

(58) Field of Classification Search
CPC ....................................................... G10L 15/26
See application file for complete search history.

(56) References Cited

U.S. PATENT DOCUMENTS

| | | | | |
|---|---|---|---|---|
| 6,122,613 | A * | 9/2000 | Baker | G10L 15/32 |
| | | | | 704/235 |
| 6,513,005 | B1 * | 1/2003 | Su | G06K 9/6293 |
| | | | | 704/231 |
| 6,912,498 | B2 | 6/2005 | Stevens et al. | |
| 7,200,555 | B1 * | 4/2007 | Ballard | G10L 15/22 |
| | | | | 704/235 |
| 7,228,275 | B1 | 6/2007 | Endo et al. | |
| 7,356,467 | B2 | 4/2008 | Kemp | |

(Continued)

*Primary Examiner* — Shreyans A Patel
(74) *Attorney, Agent, or Firm* — Honigman LLP; Brett A. Krueger

(57) ABSTRACT

Methods, systems, and apparatus, including computer programs encoded on computer storage media, for natural language processing. One of the methods includes receiving a first voice input from a user device; generating a first recognition output; receiving a user selection of one or more terms in the first recognition output; receiving a second voice input spelling a correction of the user selection; determining a corrected recognition output for the selected portion; and providing a second recognition output that merges the first recognition output and the corrected recognition output.

20 Claims, 4 Drawing Sheets

(56) References Cited

U.S. PATENT DOCUMENTS

| | | | |
|---|---|---|---|
| 8,290,772 B1* | 10/2012 | Cohen | G06F 17/276 |
| | | | 369/25.01 |
| 8,457,946 B2 | 6/2013 | Kuo et al. | |
| 8,719,014 B2 | 5/2014 | Wagner | |
| 2002/0138265 A1* | 9/2002 | Stevens | G10L 15/22 |
| | | | 704/251 |
| 2006/0015338 A1 | 1/2006 | Poussin | |
| 2006/0293889 A1* | 12/2006 | Kiss | G10L 15/22 |
| | | | 704/235 |
| 2006/0293890 A1* | 12/2006 | Blair | G06F 3/018 |
| | | | 704/235 |
| 2008/0120102 A1* | 5/2008 | Rao | G10L 15/22 |
| | | | 704/235 |
| 2008/0270118 A1* | 10/2008 | Kuo | G06F 17/2223 |
| | | | 704/9 |
| 2009/0076798 A1* | 3/2009 | Oh | G06F 17/279 |
| | | | 704/9 |
| 2014/0019127 A1* | 1/2014 | Park | G10L 15/01 |
| | | | 704/235 |
| 2016/0094889 A1 | 3/2016 | Venkataraman et al. | |

\* cited by examiner

ALLOWING SPELLING OF ARBITRARY WORDS

CROSS-REFERENCE TO RELATED APPLICATION

This U.S. patent application is a continuation of, and claims priority under 35 U.S.C. § 120 from, U.S. patent application Ser. No. 15/700,613, filed on Sep. 11, 2017, which is a continuation of U.S. patent application Ser. No. 14/989,621, filed on Jan. 6, 2016. The disclosures of these prior applications are considered part of the disclosure of this application and are hereby incorporated by reference in their entireties.

BACKGROUND

This specification relates to natural language processing.

Conventional devices can include software to respond to speech of a user of the device. The speech can typically include instructions to the device to call a phone number, text a phone number, operate an application, or search for information on the mobile device or the Internet. The device can employ conventional speech to text processes to recognize a voice input from the user.

SUMMARY

In general, one innovative aspect of the subject matter described in this specification can be embodied in methods that include the actions of receiving a first voice input from a user device; generating a first recognition output; receiving a user selection of one or more terms in the first recognition output; receiving a second voice input spelling a correction of the user selection; determining a corrected recognition output for the selected portion; and providing a second recognition output that merges the first recognition output and the corrected recognition output. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The method further includes obtaining search results responsive to the second recognition output; and providing one or more of the search results to the user device. Determining the corrected recognition output for the selected portion includes: initiating parallel voice recognition processes on the second voice input; scoring recognition outputs from each voice recognition process; and selecting a corrected recognition output based on the scores. The parallel voice recognition processes include a base voice recognition process and a letter specific voice recognition process. The letter specific voice recognition process is configured to score an arbitrary sequence of letters. The base language model process was used to generate the first recognition output. Merging the first recognition output and the corrected recognition output includes replacing the user selection of the first recognition output with the corrected recognition output.

The subject matter described in this specification can be implemented in particular embodiments so as to realize one or more of the following advantages. Misrecognized voice inputs can be corrected with a user voice correction to a particular misrecognized term without the user starting the voice input process over with a new and complete voice input. This allows the user's intended voice input to be identified more quickly. Correcting voice input improves voice recognition versatility, e.g., in performing a search in response to a voice query, or voice aided word processing.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
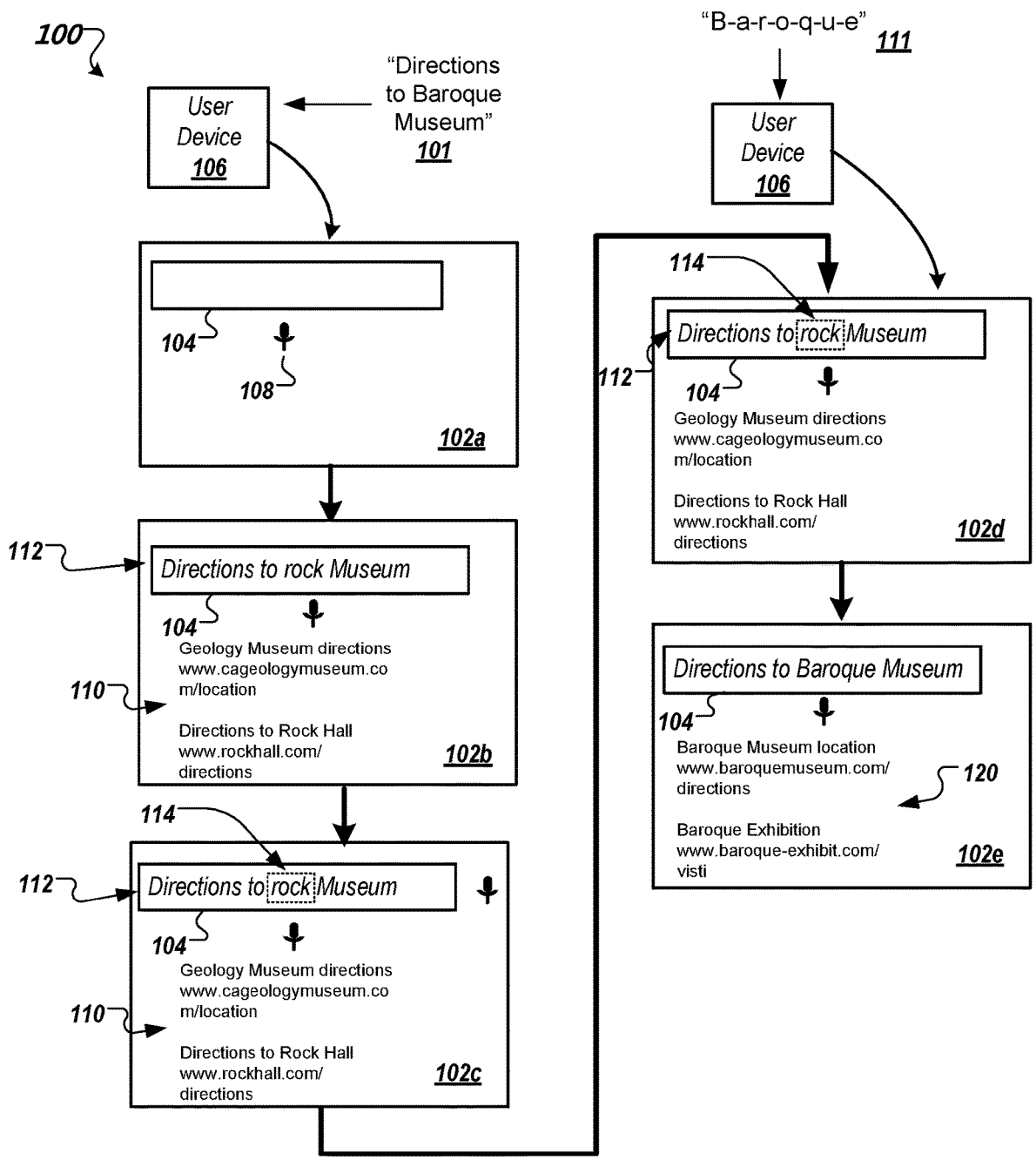
FIG. 1 is an illustration of a voice search flow including a biased correction in an example user interface.

FIG. 1 is an illustration 100 of a voice search including a correction input in an example search user interface. A search user interface is presented as one example of using the voice recognition correction techniques described in this specification. A search system provides a search user interface 102a for displaying on a user device 106, e.g., a mobile phone, tablet, or other user device configured to receive voice input. The user interface 102a includes a search box 104 for receiving a query and a microphone icon 108 for receiving a first voice query from a user instead of a typed input. The user inputs a first voice input 101, e.g., by selecting the microphone icon 108 in the user interface 102a. In some implementations, the user interface includes a keyboard layout that can be presented for typed input to the search box.

In a user session, the search system receives the first voice input 101 from a user. In particular, the user provides a voice input of "Directions to Baroque Museum" to the user device 106. In response to the first voice input 101, a user interface 102b is presented including a display of a first recognition output 112 generated from the first voice input 101 in the search box 104. The first recognition output 112 is [Directions to rock museum]. For example, a speech-to-text process can be performed on the first voice query to generate a purported transcription as the corresponding first recognition output 112. The search system can provide the transcription to the user device 106 for display in the user interface 102b.

Furthermore, the first recognition output 112 can be used as a query to a search system. The search system provides search results 110 responsive to the query [rock pictures] for display in user interface 102b. For example, the search results 110 can include links to particular resources determined by the search system to be responsive to the query. However, in this example, the recognized query was misrecognized e.g., the term "rock" instead of the term "Baroque".

As shown in user interface 102*c*, in response to the misrecognition, the user can interact with the user interface 102*c* to select a portion 114 of the first recognition output 112 corresponding to the misrecognized term "rock". For example, in a touch interface the user can touch the misrecognized term with a finger or stylus. In a non-touch interface, the user can navigate a cursor to the misrecognized term and select the term e.g., with a mouse input.

With reference to user interface 102*d*, the user provides a second voice input 111 to the user device 106. The second voice input 111 is provided to replace the selected portion 114 of the recognition output 112. The second voice input 111 is a spelling, letter by letter, of the corrected term "b-a-r-o-q-u-e" to replace the selected portion 114.

As shown in user interface 102*e*, a corrected recognition output "directions to Baroque Museum" is displayed in the search field 104. Furthermore, in response to the corrected recognition output, the search system provides search results 120 responsive to corrected query [Directions to Baroque Museum] for presentation in the user interface 102*e*. For example, the search results 120 can include links to particular resources determined by the search system to be responsive to the corrected query. In some implementations, the search system recognizes the query as a particular type of request, e.g., directions, and provides a map interface as part of or instead of the search results 120.

Figure 2:
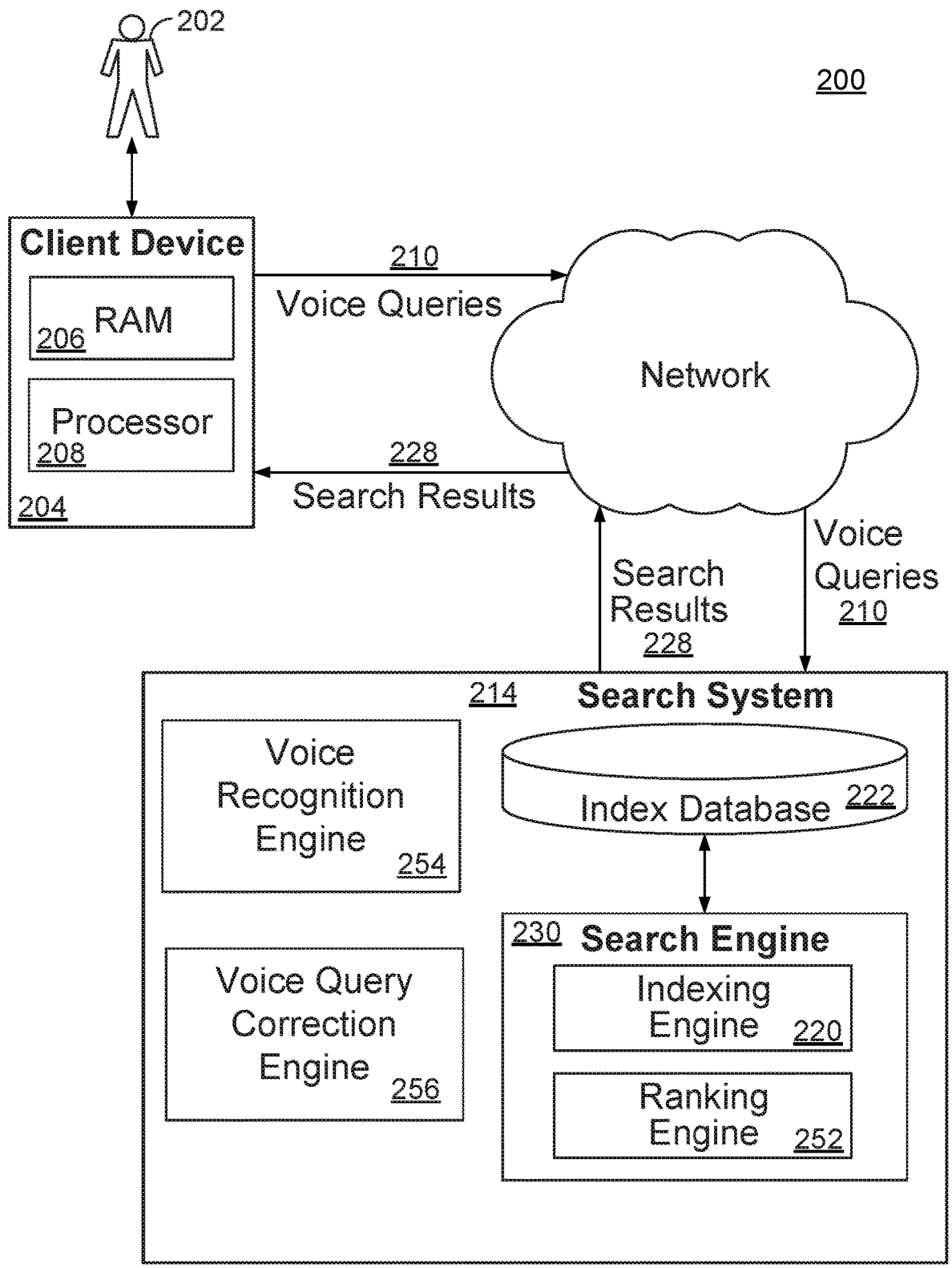
FIG. 2 is a block diagram of a system for providing corrections to voice queries.

FIG. 2 is a block diagram of an example system 200 suitable for providing corrections to voice queries. Other systems can be provided for correcting other types of voice input. The system 200 provides search results relevant to submitted queries as can be implemented in an internet, an intranet, or another client and server environment. The system 200 is an example of an information retrieval system in which the systems, components, and techniques described below can be implemented.

A user 202 can interact with a search system 214 through a client device 204. For example, the client 204 can be a computer coupled to the search system 214 through a local area network (LAN) or wide area network (WAN), e.g., the Internet. In some implementations, the search system 214 and the client device 204 can be one machine. For example, a user can install a desktop search application on the client device 204. The client device 204 will generally include a random access memory (RAM) 206 and a processor 208.

The user 202 can submit voice queries 210 to a search engine 230 within a search system 214. When the user 202 submits a voice query 210, the voice query 210 is transmitted through a network to the search system 214. The search system 214 can be implemented as, for example, computer programs running on one or more computers in one or more locations that are coupled to each other through a network.

The search system 214 includes a voice recognition engine 254. The voice recognition engine receives the voice query 210 and transcribes the voice query to a recognized query, e.g., using suitable text-to-speech techniques. In some implementations, the recognized query is returned to the client device 204 for presentation to the user 202. Additionally, the recognized query is provided to the search engine 230.

The search system 214 further includes an index database 222 and a search engine 230. The search system 214 responds to an input query by generating search results 228, which are transmitted through the network to the client device 204 in a form that can be presented to the user 202 (e.g., as a search results web page to be displayed in a web browser running on the client device 204).

When the recognized query determined from the voice query 210 is received by the search engine 230, the search engine 230 identifies resources that match, or are responsive to, the query 210. The search engine 230 will generally include an indexing engine 220 that indexes resources (e.g., web pages, images, or news articles on the Internet) found in a corpus (e.g., a collection or repository of content), an index database 222 that stores the index information, and a ranking engine 252 (or other software) to rank the resources that match the query 210. The indexing and ranking of the resources can be performed using conventional techniques. The search engine 130 can transmit the search results 228 through the network to the client device 204 for presentation to the user 202.

The search system also includes a correction engine 256. The correction engine 256 corrects the recognized query in response to a correction input from the user 202. In particular, the correction engine 256 can determine that a correction input, e.g., a selection of one or more terms of the recognized query is received followed by a voice input spelling the selected one or more terms. The correction engine 256 can determine a corrected recognition output based on the first and second voice inputs and present the corrected recognition output to the user device 204. The search engine 230 can identify resources that are responsive to the corrected recognition output and provide one or more search results.

Figure 3:
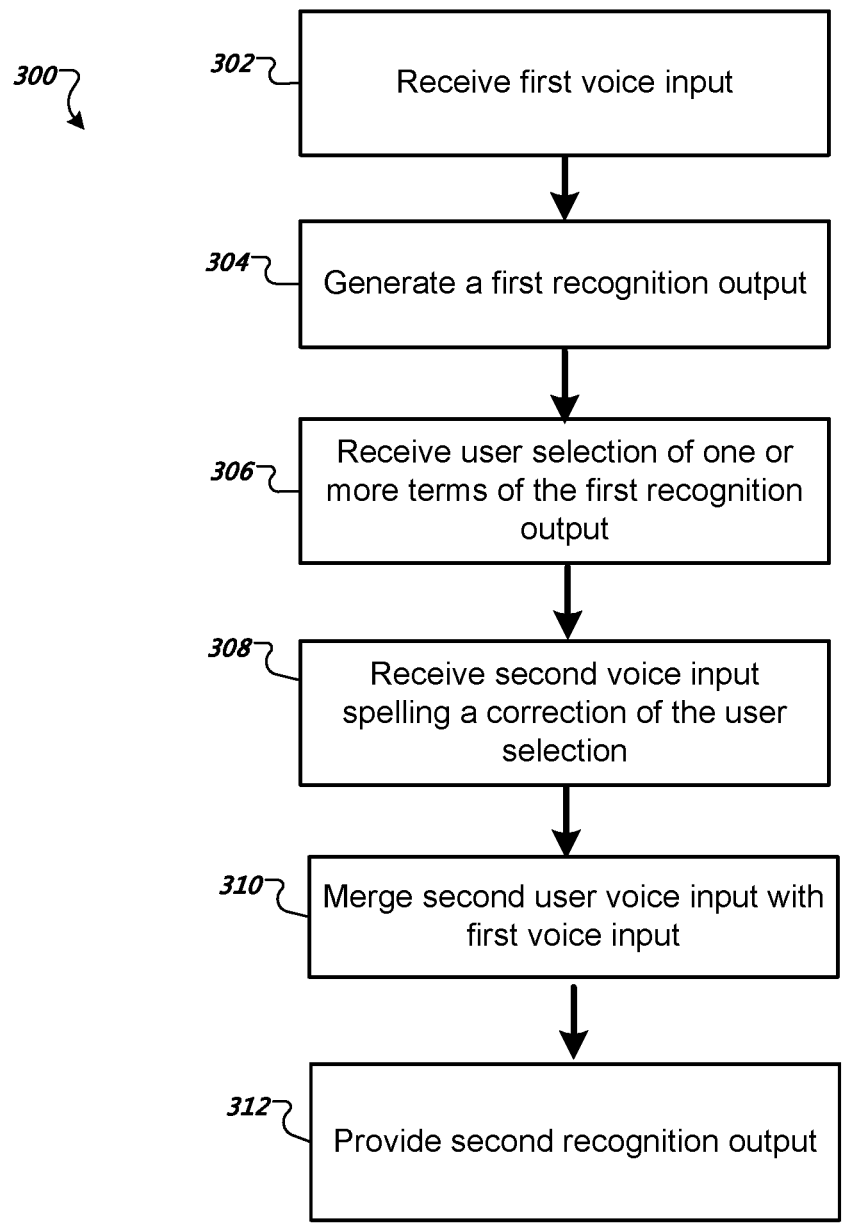
FIG. 3 is a flow diagram of an example process for correcting a voice input.

FIG. 3 is a flowchart of an example process 300 for correcting an input voice. For convenience, the process 300 will be described as being performed by a system of one or more computers, located in one or more locations, and programmed appropriately in accordance with this specification.

The system receives a first voice input from a user device (302). For example, the user can select a voice input indicator, e.g., a microphone indicator, associated with a particular user interface indicating a voice input can be provided. For example, a search user interface of the user device can include a microphone indicator. When a voice input is initiated by the user, a microphone of the user device captures voice input from the user. The voice input is then transmitted by the user device to the system. The voice query can be, for example, "directions to baroque museum."

The system generates a first recognition output (304). The first recognition output is a transcription of the received first voice input. For example, a suitable speech to text technique can be used to provide voice recognition of the first voice input and convert it into a recognized text output. The speech to text technique can include the use of an acoustic model that identifies phonemes or other linguistic units from the audio signal and a language model that assigns probabilities to particular words or sequences of words. In some implementations, the speech to text technique can correct or compensate for errors in the voice input, e.g., based on spelling and/or grammar rules.

The first recognition output is provided to the user device, for example, for display in a particular user interface. The first recognition output can be displayed, for example, to indicate the system's recognition of the first voice input. The user can then examine the presented first recognition output to determine whether the system correctly recognized the first voice input. For example, the first voice input can be the query "directions to baroque museum" which may be recognized in the first recognition output as the query [directions to rock museum]. Here the word "baroque" was misrecognized as "rock."

Additionally, the system can perform an action responsive to the first recognition output. For example, for a search query voice input, the system can obtain search results using the first recognition output as a search query. One or more search results responsive to the search query can be provided to the user device for display in the search interface. In some implementations, the action is part of a particular task, e.g., creating a calendar entry. In some other implementations, the first recognition output corresponds to the action, e.g., inputting text in a text editor or e-mail.

The system receives a user selection of one or more terms of the first recognition output (306). The user selection can be made by direct input, e.g., using a finger on a touch screen, or using a particular input device e.g., a mouse cursor or stylus. For example, the user can touch a particular term or terms of the first recognition output. In response, the selected term or terms can be highlighted by the user device indicating the selected term or terms. Thus, for a recognition input "directions to baroque museum," the user can select the word "rock."

The system receives a second voice input spelling a correction of the term or terms in the user selection (308). In particular, the user can spell out each letter of the term or terms in the user selection. For example, after selecting the term "rock" the user can spell out the individual letters "b-a-r-o-q-u-e." The spelling is not limited to a single word. For example, the first voice input can be "directions to Brandschenke Strasse" in which "Brandschenke Strasse" is misrecognized. The user can select the misrecognition and enter a second voice input of "b-r-a-n-d-s-c-h-e-n-k-e s-t-r-a-s-s-e."

The system merges the second user voice input with the first voice input (310). In particular, the system recognizes the spelled input as corresponding to one or more words and determines a merged combination of the recognized spelling and the other terms of the first recognition output. Recognition of the spelled input and merging are described in greater detail below with respect to FIG. 4.

The system provides a second recognition output (312). For example, the second recognition output can be displayed in the user interface replacing the first recognition output. In some implementations, system can perform an action responsive to the second recognition output. For example, for a search query voice input, the system can obtain search results using the second recognition output as a search query. One or more search results responsive to the search query can be provided to the user device for display in the search interface.

Figure 4:
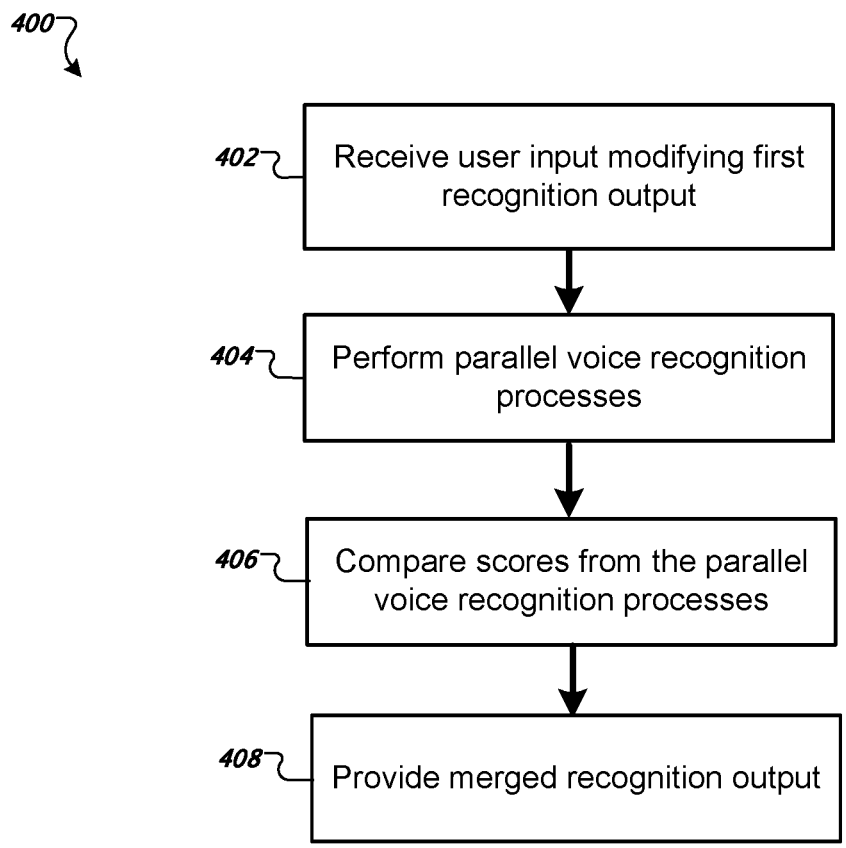
FIG. 4 is a flow diagram of an example process for determining a corrected recognition output.

FIG. 4 is a flow diagram of an example process 400 for determining a corrected recognition output. For convenience, the process 400 will be described as being performed by a system of one or more computers, located in one or more locations, and programmed appropriately in accordance with this specification.

The system receives user input modifying a recognition output (402). The recognition output can be generated in response to a voice input, e.g., of a search query, provided by a user to a user device. For example, as described above with respect to FIGS. 1-3, the user can provide an input selecting a particular term or terms of the recognition output. The user can then provide a second voice input spelling one or more letters replacing the selected term or terms. For example, the user can spell a corrected word that should replace a misrecognized term of the recognition output. The user selection of a term or terms in the recognition output can trigger a mode of the system for recognizing individual letters provided by the second voice input.

The system performs parallel voice recognition processes on the second voice input (404). The parallel voice recognition processes include a base voice recognition model, e.g., that was used to generate the recognition output, and another voice recognition model that is letter specific. In some implementations, each voice recognition model includes an acoustic model and a language model. The acoustic model can identify phonemes or other linguistic units from the audio sounds of the voice input. The language model can assign probabilities to particular words or sequences of words. In some implementations, both voice recognition processes use a same acoustic model, but differing language models.

The base voice recognition model can include a language model that generates a score for particular sequences of letters or words. In particular, the language model can be an n-gram model that assigns probabilities to particular n-gram sequences. As a result, the recognition of a word in a sequence of words can depend on one or more prior words of the sequence. Thus, the score generated by the base voice recognition model for a user spelled voice input can depend on the recognition of one or more prior words of the voice input e.g., the unselected term or terms of the recognition output.

The letter specific voice recognition model can include a language model configured to recognize any arbitrary sequence of individual letters and to score the output based on a confidence that the sequence of letters is correct rather than in comparison to likelihoods for particular words. Thus, the letter specific voice recognition model can be used to recognize words that may not be in a vocabulary of a language model or that would have a low likelihood in the language model of the base voice recognition model.

The system compares the scores from the parallel voice recognition processes (406). Based on the scores, one of the recognition outputs from the respective voice recognition processes is selected as a corrected recognition output. For example, the greater score can be used as the correct voice recognition output to replace the selected term or terms. For example, if the letter specific voice recognition output has a higher score, the recognition output of the specific combination of letters forming a particular word is used as the recognition output. Similarly, if the base voice recognition output has the higher score, the recognition output is the word or words recognized by the base voice recognition model.

For some words, particularly short words, the parallel voice recognition processes may result in equal scores. For example, the voice input "T" can correspond to the letter "T" as well as the word "tea." Similarly, "b" and "be" or "80" and "A-T." In some implementations, the scores quickly diverge, however, when the language model for the base voice recognition model takes the context of the other terms in the recognition output. For example, the score for "80" vs. "A-T" can diverge in the context of other recognized terms "the coat costs [ ] dollars" such that the score for "80" is higher than that for "A-T." Additionally, the larger the number of spelled letters, the greater the likelihood that the score for the letter specific voice recognition model will be greater than the score for a particular word using the base voice recognition model. For example, The system provides a merged recognition output (408). In particular, the corrected recognition output selected from the scored parallel voice recognition processes is used to replace the selected portion of the original voice recognition output. A combined recognition output can then be provided to the user device for display. In some implementations, system can perform an action responsive to the combined recognition output. For example, for a search query voice input, the system can obtain search results using the combined recognition output as a search query. One or more search results responsive to the search query can be provided to the user device for display in the search interface.

In this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can each be implemented as an apparatus, method, or electronic system that may include one or more processing devices and memory to store executable instructions to perform the operations described in this specification.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
    transmitting, by data processing hardware, a transcription of a voice query over a network to a user device, the transcription of the voice query when received by the user device causing the user device to display the transcription of the voice query in a user interface of the user device;
    receiving, at the data processing hardware, a correction input over the network from the user device, the correction input comprising:
        a selection indication indicating a user selection in the user interface of a misrecognized term of the transcription of the voice query displayed in the user interface; and
        a voice input from a user of the user device, the voice input including a series of letters that spells out a corrected term to replace the misrecognized term of the transcription of the voice query;
    in response to receiving the correction input from the user device, generating, by the data processing hardware, an updated transcription of the voice query based on the voice input from the user of the user device; and
    transmitting, by the data processing hardware, the updated transcription of the voice query over the network to the user device.

2. The method of claim 1, further comprising, in response to receiving the correction input from the user device:
    obtaining, by the data processing hardware, one or more search results responsive to the updated transcription of the voice query; and
    transmitting, by the data processing hardware, the one or more search results over the network to the user device.

3. The method of claim 2, wherein the one or more search results when received by the user device cause the user device to display the one or more obtained search results responsive to the updated transcription of the voice query in the user interface.

4. The method of claim 2, wherein the one or more search results when received by the user device cause the user device causing the user device to update one or more initial search results displayed in the user interface of the user device with the one or more obtained search results responsive to the updated transcription of the voice query.

5. The method of claim 1, wherein the updated transcription of the voice query when received by the user device causes the user device to display the updated transcription of the voice query in the user interface of the user device.

6. The method of claim 5, wherein the user device displays the updated transcription of the voice query by replacing the misrecognized term of the transcription of the voice query displayed in the user interface with the corrected term spelled out by the series of letters in the voice input from the user.

7. The method of claim 1, further comprising, performing, by the data processing hardware, a particular task responsive to the updated transcription of the voice query.

8. The method of claim 1, wherein the user device is configured to receive the selection indication indicating the user selection in the user interface by receiving a touch input by the user in the user interface via a finger or stylus that selects the misrecognized term of the transcription of the voice query displayed in the user interface.

9. The method of claim 1, wherein the user device is configured to superimpose a graphical indicator in the user interface that indicates the misrecognized term in response to the selection indication indicating the user selection in the user interface of the misrecognized term of the transcription of the voice query.

10. The method of claim 1, wherein the user device comprises a microphone configured to capture the voice input from the user.

11. A system comprising:
data processing hardware; and
memory hardware in communication with the data processing hardware and storing instructions that when executed by the data processing hardware causes the data processing hardware to perform operations comprising:
- transmitting a transcription of a voice query over a network to a user device, the transcription of the voice query when received by the user device causing the user device to display the transcription of the voice query in a user interface of the user device;
- receiving a correction input over the network from the user device, the correction input comprising:
  - a selection indication indicating a user selection in the user interface of a misrecognized term of the transcription of the voice query displayed in the user interface; and
  - a voice input from a user of the user device, the voice input including a series of letters that spells out a corrected term to replace the misrecognized term of the transcription of the voice query;
- in response to receiving the correction input from the user device, generating an updated transcription of the voice query based on the voice input from the user of the user device; and
- transmitting the updated transcription of the voice query over the network to the user device.

12. The system of claim 11, wherein the operations further comprise, in response to receiving the correction input from the user device:
- obtaining one or more search results responsive to the updated transcription of the voice query; and
- transmitting the one or more search results over the network to the user device.

13. The system of claim 12, wherein the one or more search results when received by the user device cause the user device to display the one or more obtained search results responsive to the updated transcription of the voice query in the user interface.

14. The system of claim 12, wherein the one or more search results when received by the user device cause the user device causing the user device to update one or more initial search results displayed in the user interface of the user device with the one or more obtained search results responsive to the updated transcription of the voice query.

15. The system of claim 11, wherein the updated transcription of the voice query when received by the user device causes the user device to display the updated transcription of the voice query in the user interface of the user device.

16. The system of claim 15, wherein the user device displays the updated transcription of the voice query by replacing the misrecognized term of the transcription of the voice query displayed in the user interface with the corrected term spelled out by the series of letters in the voice input from the user.

17. The system of claim 11, wherein the operations further comprise, performing a particular task responsive to the updated transcription of the voice query.

18. The system of claim 11, wherein the user device is configured to receive the selection indication indicating the user selection in the user interface by receiving a touch input by the user in the user interface via a finger or stylus that selects the misrecognized term of the transcription of the voice query displayed in the user interface.

19. The system of claim 11, wherein the user device is configured to superimpose a graphical indicator in the user interface that indicates the misrecognized term in response to the selection indication indicating the user selection in the user interface of the misrecognized term of the transcription of the voice query.

20. The system of claim 1, wherein the user device comprises a microphone configured to capture the voice input from the user.

* * * * *